United States Patent Office 2,970,987
Patented Feb. 7, 1961

2,970,987
COPOLYMER HAVING AMIDE AND URETHANE LINKAGES

Emerson L. Wittbecker, West Chester, Pa., assignor to E. I. du Pont de Nemours and Company, Wilmington, Del., a corporation of Delaware No Drawing. Filed May 8, 1957, Ser. No. 657,742

6 Claims. (Cl. 260—77.5)

This invention relates to a novel and useful fiber-forming polymer. More specifically it relates to a soluble, high melting copolymer containing both amide and urethane linkages.

It is an object of the present invention to provide a novel and useful polymeric material.

Another object is to provide a copolymer possessing both urethane and amide linkages, which copolymer is fiber-forming, soluble and high melting.

These and other objects will become apparent in the course of the following specification and claims.

The products of the present invention are useful in the production of shaped articles. For instance, fibers may be formed by wet or dry spinning techniques and films by conventional casting, extrusion or the like. The polymeric product may also be used in forming protective coatings, as for example, upon fabrics.

In accordance with the present invention a piperazine copolymer containing amide and urethane linkages is provided, the said copolymer being composed of units of the structure

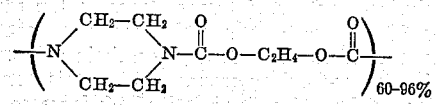

and

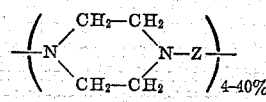

wherein the parenthetical subscripts represent the molar percentage and ranges of permissible molar percentages of each unit in the final product, Z being a divalent radical of the class consisting of adipyl, terephthaloyl and hexahydroterephthaloyl.

The copolymer of the present invention as defined above may be prepared by an "interphase polymerization technique." In accordance with this technique the reactants are brought together in such a way that the reaction zone is at, or is immediately adjacent to, a liquid-liquid interface and most of the molecules of at least one of the intermediates must diffuse through liquid diluent to arrive at the reaction zone. The process as applied in forming the polymer of the present invention comprises bringing together piperazine in one liquid phase and organic diacid halide and bis-haloformate mixture in a second liquid phase immiscible with the first phase, mixing the liquid phases to form a system comprised of two liquid phases such that the piperazine and the mixture of diacid halide and bis-haloformate are in separate phases and at least one of the phases includes a liquid diluent, maintaining the phases in admixture until the desired condensation polymerization has taken place, and then, if desired, separating the resulting polymer. Preferably, one intermediate is a liquid under the reaction conditions or is dissolved in a diluent, but one of the intermediates may be a finely divided solid dispersed or suspended in a diluent in which the intermediate is at least partially soluble.

The following examples are cited to illustrate the invention. They are not intended to limit it in any manner. Unless otherwise indicated, the proportion of reactants is expressed in parts by weight. The inherent viscosity values of the polymers are given as an indication of the degree of polymerization obtained. In view of the relative ease with which these values are determined they provide a useful method of evaluating the product of the polymerization. The values may be misleading when used to compare different types of polymers but in general those polymers of the class defined herein having an inherent viscosity of at least about 0.6 are spinnable. In determining these values, viscometer flow periods are determined at $30.0 \mp 0.1°$ C. for a solvent of the polymer and for a solution of the polymer in the solvent at a concentration of 0.5 gram per 100 cubic centimeters of solution. The inherent viscosity value is then calculated as 2 times the natural logarithm of the relative viscosity of the solution compared to that of the pure solvent. Unless otherwise specified, the solvent employed is m-cresol. "Polymer melt temperature" is the minimum temperature at which a sample of the polymer leaves a wet, molten trail as it is stroked with moderate pressure across a smooth surface of a heated block.

Example I

A dispersion is prepared in a Waring Blendor jar from 10.6 parts of sodium carbonate dissolved in 130 parts of water, 20 parts of an aqueous solution containing 5% of sodium lauryl sulfate, 4.6 parts of piperazine dissolved in 40 parts of water and 22 parts of benzene. To the stirred dispersion a solution of 2.6 parts of trans hexahydroterephthaloyl chloride and 7.0 parts of ethylene bischloroformate in 21.2 parts of methylene chloride and 8.8 parts of benzene is added. The reactants are in a molar proportion of 50:37.5:12.5 (piperazine:bischloroformate:acid chloride). Ten minutes after mixing, the polymer product is filtered off, washed and dried. An 85% yield of spinnable polymer having an inherent viscosity of 1.54 and a polymer melt temperature of 350° C. is obtained.

A solution containing 28% of the above polymer is prepared employing a mixture of 85 parts of chloroform and 15 parts of formic acid. The solution is then extruded under pressure, through a 2-hole (0.08 mm. diameter) spinneret, into a spinning column maintained at a temperature between 95° and 100° C. A continuous yarn is formed and is drawn to 4.5 times its extruded length in a steam saturated atmosphere. The yarn possesses a tenacity of 3.5 grams per denier, an elongation at the break of 23% and an initial modulus of 40 grams per denier.

When the polymerization is repeated employing hexahydroterephthaloyl chloride (high in cis-isomer content), employing the reactants in a molar proportion of 50:40:10 (piperazine:bischloroformate:acid chloride), a product having an inherent viscosity of 1.66 and a polymer melt temperature of 250° C. is obtained.

Example II

A dispersion is prepared in a Waring Blendor jar from 10.6 parts of sodium carbonate dissolved in 130 parts of water, 20 parts of an aqueous solution containing 5% of sodium lauryl sulfate, 4.6 parts of piperazine dissolved in 100 parts of water and 50 parts of benzene. To the stirred dispersion a solution of 2.5 parts of terephthaloyl chloride and 7.0 parts of ethylene bischloroformate in 67 parts of methylene chloride and 38 parts of benzene is added. The reactants are in a molar proportion of 50:37.5:12.5 (piperazine:bischloroformate:acid chlorode). Ten minutes after mixing, the polymer product is filtered off, washed and dried. A 75% yield of spinnable polymer, having an inherent viscosity of 1.43 and a polymer melt temperature of 350° C. is obtained.

When the molar proportions of reactants in the above polymerization is shifted to 50:40:10 (piperazine:bischloroformate:acid chloride), the product has an inherent viscosity of 1.94 and a polymer melt temperature of 310° C. A molar proportion of reactants of 50:47.5:2.5 (piperazine:bischloroformate:acid chloride) produces a product having an inherent viscosity of 1.5 and a polymer melt temperature of 260° C.

When isophthaloyl chloride is substituted for terephthaloyl chloride in the molar proportions of 50:40:10 (piperazine:bischloroformate:acid chloride) and using methylene chloride in place of benzene, the product, with an inherent viscosity of 2.12 has a crystalline melting point of 174–175° C. (determined on the hot stage polarized microscope).

*Example III*

A dispersion is prepared in a Waring Blendor jar from 10.6 parts of sodium carbonate dissolved in 130 parts of water, 20 parts of an aqueous solution containing 5% of sodium lauryl sulfate, 4.6 parts of piperazine dissolved in 40 parts of water and 15 parts of benzene. To the stirred dispersion a solution of 2.75 parts of adiply chloride and 6.55 parts of ethylene bischloroformate in 33.5 parts of methylene chloride and 7 parts of benzene is added. The reactants are in a molar proportion of 50:35:15 (piperazine:bischloroformate:acid chloride). Ten minutes after mixing, the polymer product is filtered off, washed and dried. A 70% yield of spinnable polymer, having an inherent viscosity of 1.95, a polymer melt temperature of 280° C. is obtained.

A shift in the reactant proportions in the above polymerization to provide a molar proportion of 50:37.5:12.5 (piperazine:bischloroformate:acid chloride) produces a product with an inherent viscosity of 2.0 and a polymer melt temperature of 265° C.

All of the above polymers are spinnable. They are soluble in such solvents as a mixture of chloroform and formic acid (85:15), a mixture of trichloroethane and formic acid (60:40) and a mixture of chloroform and methanol (88:12).

The interphase polymerization process useful in preparing the copolymers of the present invention may be carried out with a large number of variations. Broadly these include: (1) non-aqueous systems in which at least one of the reactants is dissolved or dispersed in a diluent or diluents such that at least two liquid phases are obtained upon the initial mixing, and (2) aqueous systems in which the diamine is dissolved or dispersed in water, or water and another diluent, and in which the diacid halide is undiluted or is dissolved or dispersed in a non-aqueous liquid diluent of such character that on mixing the liquids a system of two liquid phases is obtained initially.

It will be seen that the first broad method encompasses such variations as (a) a diamine dissolved or dispersed in a non-aqueous liquid diluent and reacted with a liquid diacid halide, bischloroformate mixture which is substantially insoluble in this non-aqueous diluent, (b) a diacid halide, bischloroformate mixture dissolved or dispersed in a non-aqueous liquid diluent and reacted with a liquid diamine which is substantially insoluble in this non-aqueous liquid diluent, (c) a diamine dissolved or dispersed in a non-aqueous liquid diluent and reacted with a diacid halide, bischloroformate mixture dissolved or dispersed in a non-aqueous diluent such that the two non-aqueous diluents are immiscible, and (d) either a diamine or a diacid halide, bischloroformate mixture dissolved or dispersed in an emulsion of non-aqueous diluents and reacted with the other reactant, which may be diluted with a non-aqueous diluent immiscible with one of the diluents for the first reactant. For purposes of the present invention, whenever a reactant is said to be "dispersed" in a diluent, the term is employed in its broadest sense to include molecular dispersions, i.e., cases in which the reactant is dissolved in a diluent.

The process is operable over a wide range of temperatures from just above the freezing point of the phase having the highest freezing point up to temperatures at which decomposition products form to an objectionable extent. However, in view of the rapidity with which the polymeric products are formed at moderate temperatures, there is no advantage in using temperatures higher than 150° C. and it is preferred that the reaction be carried out in the moderate temperature range of −10° C. to +60° C.

It is essential that the solvent or diluent employed for a specific reactant be inert toward it. It is not essential, however, that the solvent or diluent used in one phase be completely inert to the reactant in the other phase. Generally speaking, it is essential that the reactants be more reactive toward each other than either reactant is to the solvent or diluent of the other phase.

Since the reaction rate of diamines with diacid halide, bischloroformate mixtures is rapid at room temperature, it is preferable that the addition of the two phases containing the separate reactants be accompanied by sufficiently rapid stirring to produce an emulsion of fine particle size. Such emulsions may be equally well produced by other means, for example, by impinging two high velocity liquid streams upon each other in a suitable manner. When an emulsion of fine particle size is provided the available diamine and/or the diacid halide bishaloformate mixture is completely used up in a matter of a few seconds, or at most in a matter of a few minutes, depending to an extent on the sum total of the reaction conditions.

When fibers are prepared from the copolymers of the present invention by spinning from the melt or by spinning from solution at elevated temperatures in the range of 150° to 300° C., a further polymerization reaction is likely to occur because the polymer chain still contains terminal polymer-forming groups. When this occurs the molecular weight and melt viscosity both increase. Such changes in viscosity and molecular weight may constitute a serious problem in the preparation of uniform filaments. This can be overcome by treating the unstabilized polymer with a mono-functional reactant, such as a monoamine, a monoacid halide, or a monochloroformate, and thus block off the remaining polymer-forming end groups to form a stabilized polymer. An alternative method is to employ a monofunctional amine, a monofunctional acid chloride or a monofunctional chloroformate as a stabilizer in the polymer-forming reaction of this invention. Small amounts of these monofunctional reactants, for example, from 0.1 to 5 mol percent, will enter into the reaction during the formation of polymer chains and serve as non-reactive end groups for these chains. Consequently, when such a polymer is subsequently heated for the purposes of melt spinning, niether the molecular weight nor the viscosity will increase, since there are no polymer-forming terminal groups.

Relatively impure reactants may be employed in the interphase polymerization process. For example, dicarboxylic acids frequently constitute major impurities in diacid halides. These dicarboxylic acids do not react under the conditions employed for the process of this invention and consequently do not enter into the polyamide formation. Instead they remain in the spent reaction liquor and are easily separated from the solid precipitated polyamide. Likewise, it has been found that the diamine may be grossly contaminated with diamine carbonate, an impurity which is difficult to prevent. All manner of impurities which are non-reactive with either of the reactants under the conditions of this polymerization may be present without affecting the constitution or the purity of the product. These impurities will not be a part of the polymer produced and will either remain in the spent reaction liquor or, should they be insoluble in the diluents employed they can be readily leached from the polymer. If any impurity is valuable as a starting material for the preparation of a reactant, it can be recovered from the spent liquor and then be converted to the reactant for use in the process. In this way the efficiency of the over-all reaction can be improved for impure reactants and the cost of the final product correspondingly reduced. Monofunctional reactants of the type described above which serve as stabilizers are, of course, not to be considered among the classes of impurities which can be tolerated in large amounts.

In following the interphase polymerization technique it is not necessary that the reactants be employed in equivalent proportions. Any excess of one reactant simply remains in the supernatant liquid from which the product precipitates. It has been found that the process of interfacial polymerization of diamines with diacid halide, bischloroformate mixtures yields copolymers of high molecular weight whether one reactant is in excess by 300% or even more, or whether the reactants are in equivalent or nearly equivalent amounts. For purposes of economy, it is usually desirable to employ the reactants in equivalent or nearly equivalent amounts.

The concentration of the reactants in the separate liquid phases can vary over wide limits and still produce high molecular weight copolymers. Either complementary reactant, but not both, may be employed in 100% concentration as the pure compound. Likewise, either reactant may be employed in a very low concentration in its separate liquid phase, for example, concentrations as low as 0.1% or even lower are useful.

It is sometimes advantageous to employ an emulsifying agent to assist in suspending one liquid phase in the other. To this end, water or organic soluble emulsifying agents may be used. Examples of organic soluble agents are the "Spans" (Atlas Powder Co., sorbitan monofatty acid esters), the higher fatty alcohols, the higher fatty alcohol esters, "Naccolene F" (Allied Chem. & Dye Co., alkyl aryl sulfonate), "Acto 700" (Stanco Inc., sodium petroleum sulfonate), "Alkaterge C" (Commercial Solvents Corp. substituted oxazoline), "Betanols" (Beacon Co. high molecular weight esters), "Duponol" OS (E. I. du Pont de Nemours and Company, higher alcohol derivative), etc.

Where one phase is aqueous, the emulsifying agents may be cationic, anionic or non-ionic. Representative examples of cationic emulsifying agents are "Lorol" pyridinium chloride ("Lorol" is the trade-name for the mixture of aliphatic alcohols obtained by hydrogenation of coconut oil), "Triton K-60" (Rohm & Haas Co., cetyl dimethyl benzyl ammonium chloride), "Nopcogen 17L" (Nopco Chem. Co., a hydroxylated polyamide). Representative examples of non-ionic agents are the "Tweens" (Atlas Powder Co., polyoxyethylene derivatives of sorbitan monoesters of long-chain fatty acids), "Triton N-100" (Rohm & Haas Co., alkylated aryl polyether alcohol), the "Elvanols" (E. I. du Pont de Nemours and Company, partially hydrolyzed polyvinyl acetates of various molecular weights), etc. and representative examples of the anionic emulsifying agents are soaps, the amine salts, "Duponol" WA (E. I. du Pont de Nemours and Company, alcohol sulfate), "Aerosol OT" (American Cyanamid Co., dioctyl ester of sodium sulfosuccinic acid), "Aresklene 400" (Monsanto Chemical Co., dibutyl phenol sodium disulfonate), "MP-189S" (E. I. du Pont de Nemours and Company, hydrocarbon sulfonate), etc.

It is likewise desirable to use an acid acceptor for the hydrogen halide which is liberated in the course of the reaction. The diamine itself can serve as the acid acceptor by forming the amine salt. Since the amine salt is incapable of reacting with the diacid halide, it is desirable in this instance to start with at least 2 equivalents of diamine for every equivalent of diacid halide, bischloroformate mixture to ensure that all the diacid halide is used up. To circumvent the necessity for using this large excess of diamine, an acid acceptor may be employed, preferably with the liquid phase containing the diamine. When the amount of added acid acceptor is equivalent to the amount of liberated hydrogen halide, none of the diamine will be rendered unreactive. Larger amounts or lesser amounts of the added acid acceptor may be employed. The added acid acceptor may range from zero up to an amount equivalent to 15 times the diamine present or even more. Preferably, the added acid acceptor, if one is used, will be in the range of 1 to 3 times the amount equivalent to the diamine present. To be effective, the added acid acceptor must be a stronger base than the diamine contained in the same liquid phase so that the hydrogen halide preferentially reacts with the added acid acceptor. Depending on the basicity of the diamine the added acid acceptor may be caustic alkali, an alkali carbonate or other salt of a strong base and a weak acid, a tertiary organic base or the like.

These basic materials may be added directly to one of the liquid phases or sometimes to both the liquid phases either before or during the course of the reaction. If these basic materials are not added before or during the polymerization, they may be added to the spent reaction liquor as a means of reforming the diamine from the diamine hydrophalide, so that the diamine may be put through the reaction again. The liquid phase containing the diamine can be strongly alkaline and still not prevent the preferential reaction of the diacid halide with the diamine.

It is sometimes desirable to load the solvent for the respective reactants with non-reactive solutes so as to produce for example, a better yield, or a higher molecular weight product. Such non-reactive substances may be salts such as sodium chloride, potassium bromide, lithium sulphate and the like for loading the aqueous phase.

Shaped structures of the polymers of the present invention may be made directly by the process of Magat et al. in United States Patent 2,708,617. Any low temperature polymerization process is suitable. In general, such processes will employ fast reactants. The product of the present invention may be formed, for instance, from reactants wherein 1 mole of piperazine is reacted with 1 mole of a mixture of ethylene bischloroformate and a diacid halide from the class consisting of adipyl, terephthaloyl and hexahydroteterphthaloyl chloride, the ethylene bischloroformate comprising from 60 to about 96% of the non-piperazine reactant. The product be viewed as containing units of the structure

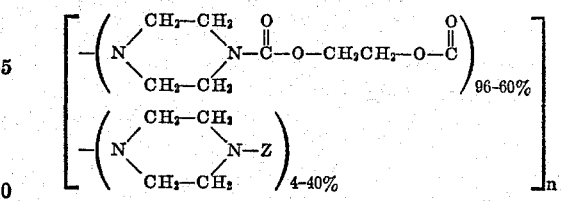

wherein the parenthetical subscripts represent the molar percentage and ranges of permissible molar percentages of each unit in the final product, Z being a divalent radical of the class consisting of adipyl, terephthalolyl and hexahydroteteptthaloyl and $n$ being a large number. As previously pointed out, these materials all have a melting point above about 250° C. and are readily soluble in such solvents as chloroform and azeotropic mixtures of chloroform and formic acid, 1,1,2-trichloroethane and formic acid and chloroform and methanol. Contrary to the general rule, the melting point of the copolymer is not lower than the melting point of each constituent. The shaped structures, particularly the fibers, have lower static propensity than the related polyamides permitting ready processing in an atmosphere of relatively high humidity, for instance, within a range of from 25% to 60% relative humidity or higher.

The polymers of the present invention are particularly useful in the production of shaped structures such as films and filaments. As pointed out above, such structures can be readily formed by dry spinning or film casting techniques. The filaments, because of their high melting and antistatic properties are exceptionally good for textile use. They are also useful for insulation, coatings, tire cord, heat stable filters and the like.

Many equivalent modifications of the above will be apparent to those skilled in the art without a departure from the inventive concept.

What is claimed is:

1. A high molecular weight and high melting point copolymer containing amide and urethane linkages and composed of units of the structure

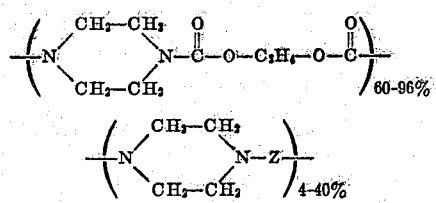

wherein the parenthetical subscripts represent the molar percentage and ranges of permissible molar percentages of each unit in the final product, Z being a divalent radical of the class consisting of adipyl, terephthaloyl and hexahydroterephthaloyl.

2. The polymer of claim 1 wherein Z is adipyl.
3. The polymer of claim 1 wherein Z is terephthaloyl.
4. The polymer of claim 1 wherein Z is hexahydroterephthaloyl.
5. The polymer of claim 4 wherein the hexahydroterephthaloyl radical is the trans-isomer.
6. The polymer of claim 4 wherein the hexahydroterephthaloyl radical is the cis-isomer.

References Cited in the file of this patent

UNITED STATES PATENTS

| 2,731,445 | Wittbecker | Jan. 17, 1956 |
| 2,731,446 | Wittbecker | Jan. 17, 1956 |
| 2,813,775 | Steuber | Nov. 19, 1957 |

FOREIGN PATENTS

| 895,395 | France | Apr. 3, 1944 |
| 1,123,599 | France | June 11, 1956 |

OTHER REFERENCES

Edgar et al.: Journal of Polymer Science, vol. 8, 1952, pages 1–20.